(12) United States Patent
Mixon et al.

(10) Patent No.: US 7,301,851 B1
(45) Date of Patent: Nov. 27, 2007

(54) UNDERWAY HULL SURVEY SYSTEM

(75) Inventors: Larry Mixon, Panama City, FL (US);
Linda Lampl, Tallahassee, FL (US);
Thomas Herbert, Tallahassee, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 268 days.

(21) Appl. No.: 11/177,653

(22) Filed: Jul. 5, 2005

(51) Int. Cl.
*G03B 42/06* (2006.01)

(52) U.S. Cl. ...................................... 367/11

(58) Field of Classification Search .................. 367/11, 367/13, 7, 88; 114/222
See application file for complete search history.

(56) References Cited

U.S. PATENT DOCUMENTS

| | | | |
|---|---|---|---|
| 4,174,524 A * | 11/1979 | Moran | 348/31 |
| 4,784,078 A * | 11/1988 | Feurt | 114/222 |
| 6,317,387 B1 * | 11/2001 | D'Amaddio et al. | 367/129 |
| 2006/0034485 A1 * | 2/2006 | Negahdaripour | 382/103 |
| 2006/0114748 A1 * | 6/2006 | Rogers | 367/88 |

* cited by examiner

Primary Examiner—Daniel Pihulic
(74) Attorney, Agent, or Firm—James T. Shepherd

(57) ABSTRACT

A method and survey system for inspecting hulls of ships has a base portion and side portions defining an inspection channel in water. Sonar is mounted on the side portions transmitting acoustic signals onto a hull as a ship passes through the inspection channel, receiving reflected acoustic signal portions of the transmitted acoustic signals, and converting the reflected acoustic signal portions into electromagnetic acousto-signals corresponding to the hull and objects on the hull. An electro-optic scanning array is mounted on the base member transmitting optical signals onto the hull as the ship passes through the inspection channel, receiving reflected optical signal portions of the transmitted optical signals, and converting the reflected optical signal portions into electromagnetic opto-signals corresponding to the hull and objects on the hull. A control module receiving the corresponding electromagnetic acousto-signals and opto-signals transmits these signals as amplified RF signals.

10 Claims, 2 Drawing Sheets

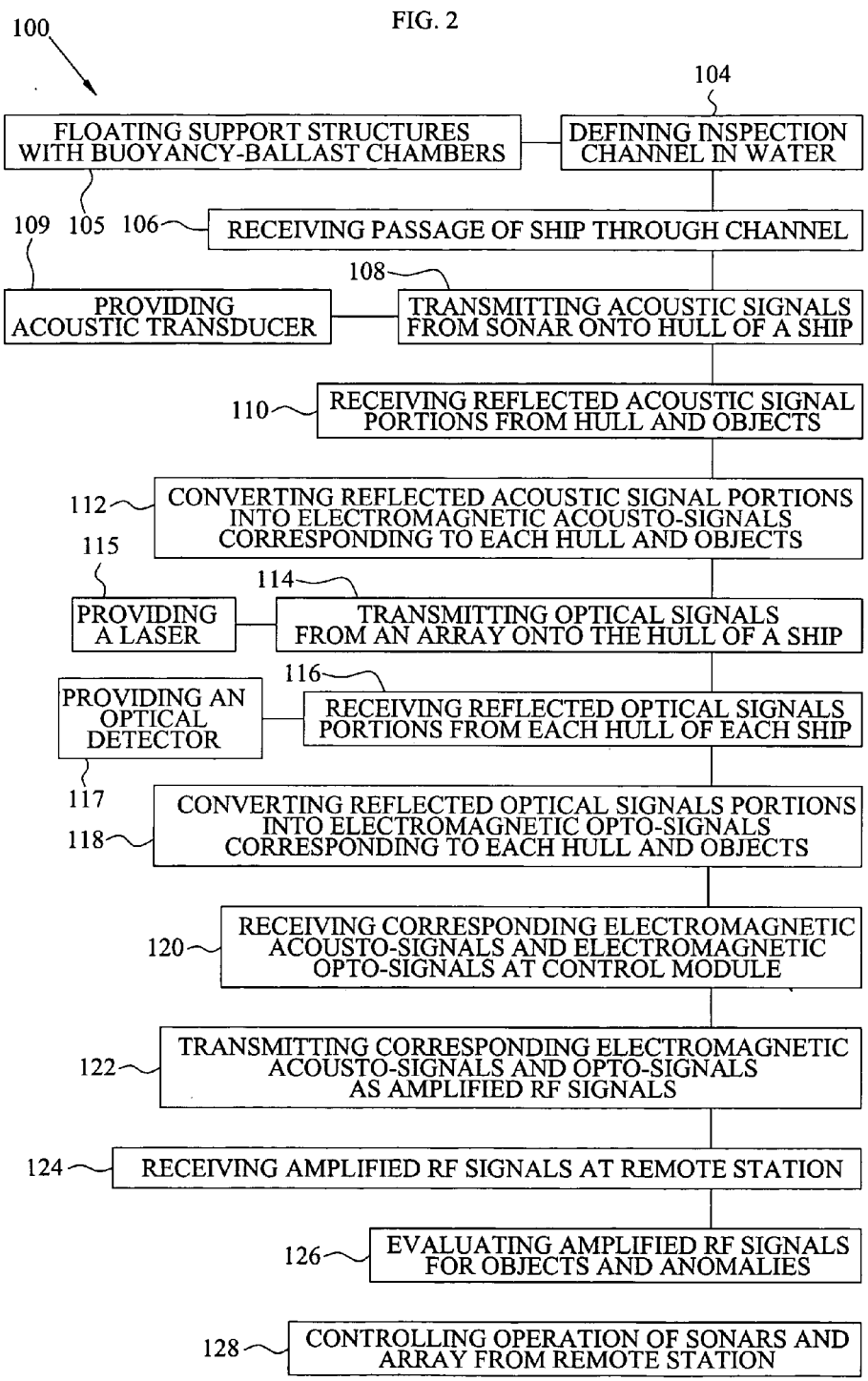

UNDERWAY HULL SURVEY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to inspection of ships' hulls. More particularly, this invention is to a system and method for optically and acoustically inspecting the entire hulls of ships that can be underway toward or away from a harbor or other protected anchorage.

Current methods of inspecting ships' hulls have required divers to inspect the hull either manually or with hand held sonar devices. These methods are man-power intensive and expensive. There are areas along the hull that it is considered unsafe for diver operations limiting a complete hull search. Divers are not currently able to navigate to a great degree of accuracy to ensure a complete search of the assigned areas, further limiting the percent of the hull inspected. The ship and harbor area can be tied up for the duration of the inspection.

Thus, in accordance with this inventive concept, a need has been recognized in the state of the art for a means for optically and acoustically inspecting hulls of ships thoroughly and quickly before the ships enter or exit a harbor or other area of interest.

OBJECTS AND SUMMARY OF THE INVENTION

An object of the invention is to provide a method and system for inspecting the undersides of ship hulls.

Another object of the invention is to provide a method and system for inspecting the undersides of ship hulls using electro-optic and sonar arrays.

Another object of the invention is to provide a method and apparatus for inspecting the undersides of ship hulls outside of harbor areas and port facilities.

Another object of the invention is to provide a method and apparatus for inspecting the undersides of ship hulls outside of harbor areas and port facilities and transmitting inspection data to a remote station for evaluation.

Another object of the invention is to provide a method and system for rapidly inspecting the undersides of ship hulls and not exposing divers or other personnel to danger.

Another object of the invention is to provide a method and system for inspecting the entire undersides of ship hulls for objects that may have been covertly attached without unduly exposing others to danger.

Another object of the invention is to provide a method and system for inspecting the undersides of ship hulls using electro-optic arrays using laser illumination and sonar arrays operating as side scan sonar, synthetic aperture sonar, and high-frequency imaging sonar.

These and other objects of the invention will become more readily apparent from the ensuing specification when taken in conjunction with the appended claims.

Accordingly, the present invention is to a method and system for rapidly inspecting the entire undersides of ship hulls. A support structure has a base portion connected at opposite ends to first and second side portions. The base portion and first and second side portions define an inspection channel in water to receive and allow passage of ships during inspection. Sonar is mounted on each of the first and second side portions and faces upward toward the center of the inspection channel. Each sonar transmits acoustic signals onto the hull as the ship passes through the inspection channel, receives reflected acoustic signal portions of the transmitted acoustic signals that are representative of the hull and objects on the hull, and converts the reflected acoustic signal portions into electromagnetic acousto-signals corresponding to the hull and objects on the hull.

An electro-optic scanning array is mounted on said base member and faces upward toward the center of the inspection channel. The array transmits optical signals onto the hull as the ship passes through the inspection channel, receives reflected optical signal portions of the transmitted optical signals that are representative of the hull and objects on the hull, and converts the reflected optical signal portions into electromagnetic opto-signals corresponding to the hull and objects on the hull.

A control module receives the corresponding electromagnetic acousto-signals and corresponding electromagnetic opto-signals and transmits them as amplified RF signals to a remote station for evaluating the amplified RF signals for objects on the hull and for controlling operation of the sonars and the electro-optic scanning array.

Each sonar has at least one acoustic transducer transmitting the acoustic signals onto the hull as the ship passes through the inspection channel, receiving the reflected portions of the transmitted acoustic signals representative of the hull and objects on the hull, and converting the reflected acoustic signal portions into electromagnetic acousto-signals corresponding to the hull and objects on the hull. The array has at least one laser transmitting the optical signals onto the hull as the ship passes through the inspection channel. The array has at least one optical detector receiving the reflected portions of the transmitted optical signals representative of the hull and objects on the hull, and converting the reflected optical signal portions into electromagnetic opto-signals corresponding to the hull and the objects on the hull.

The first and second side portions and base portion have buoyancy-ballast chambers for floating the support structure on the water to define the inspection channel in the water.

BRIEF DESCRIPTION OF THE DRAWINGS

FIG. 2 shows the method of the invention for inspecting the entire undersides of ship hulls.

DESCRIPTION OF THE PREFERRED EMBODIMENTS

Figure 1:
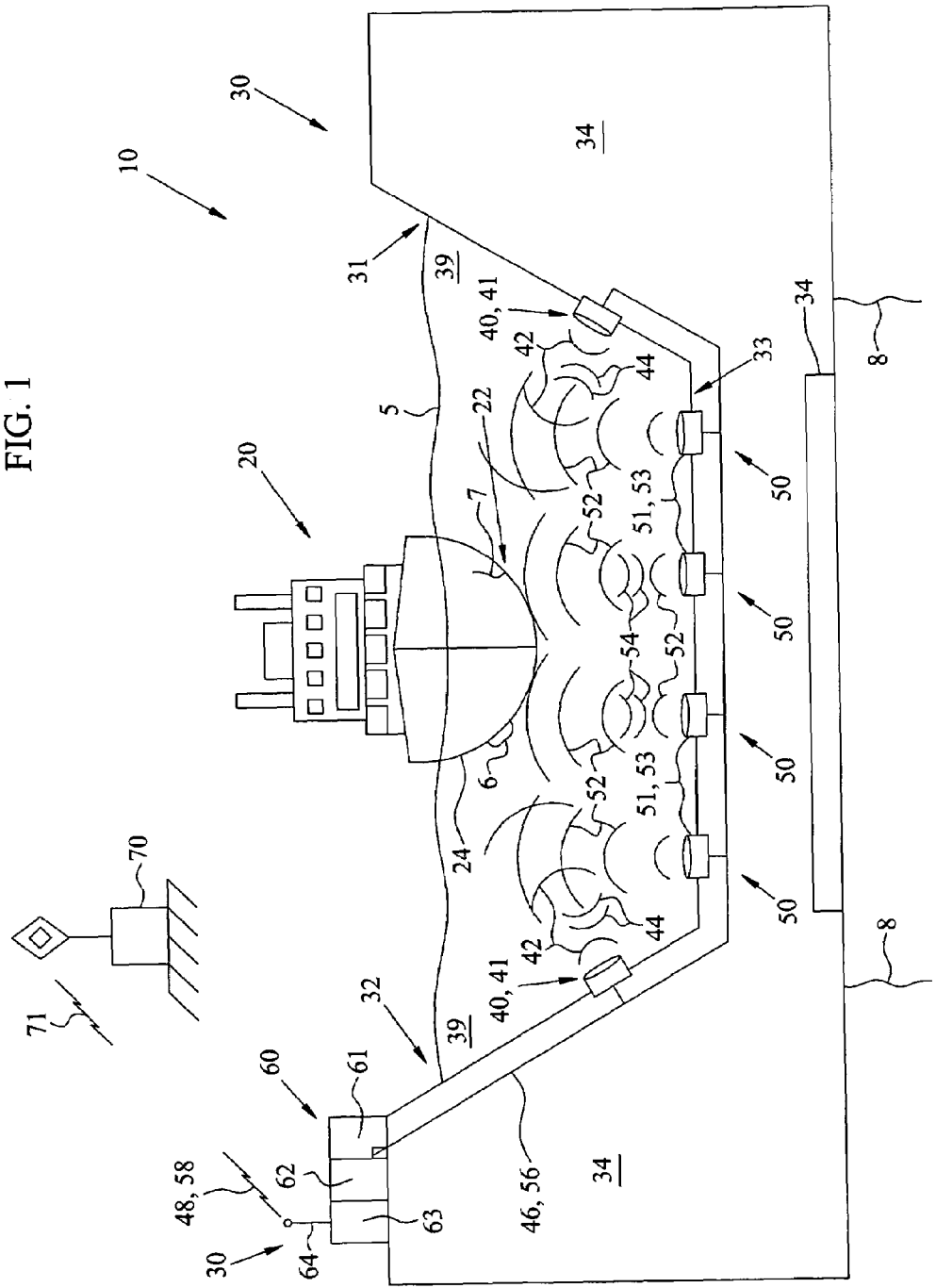
FIG. 1 is a schematic cross-sectional view of the system of the invention for inspecting the entire undersides of ship hulls.

Referring to FIG. 1 of the drawings, a survey system 10 of the invention is shown performing an inspection as a ship 20 proceeds underway through it on water 5. Inspection system 10 subjects the entire underside 22 of hull 24 of ship 20 to a thorough inspection along its entire length. Inspection system 10 can reveal objects 6 such as explosive charges or other anomalies 7 of interest such as damage or separations on hull 24 for appropriate action.

Inspection system 10 has a support structure 30 including a pair of side potions 31 and 32 upwardly extending from a base portion 33 that together define an inspection channel 39 filled with water 5. Inspection channel 39 can have a depth of about twenty to two hundred feet and a width of about two hundred feet. Side portions 31, 32 can be sloped and each have at least one sonar 40 mounted on each of portions 31, 32 and faced upward toward the center of inspection channel 39. Base portion 33 has an electro-optic scanning array 50 upwardly facing toward the center of inspection channel 39. Each sonar 40 and electro-optic scanning array 50 can be connected to a control module 60 on either of side portions 31, 32.

Control module 60 has a source of electrical power 61 connected to sonar 40 and electro-optic scanning array 50 and has a computer 62 that can be programmed to activate controlling sonar 40 and electro-optic scanning array 50 to transmit acoustic signals 42 and optical signals 52 toward ship 20 as it proceeds through inspection channel 39. Sonar 40 and electro-optic scanning array 50 receive reflected acoustic signal portions 44 and reflected optical signal portions 54 of the transmitted acoustic signals 42 and transmitted optical signals 52 from ship 20, respectively. Reflected acoustic signal portions 44 and reflected optical signal portions 54 are representative of hull 24 and possible objects 6 and/or anomalies 7 on hull 24.

In other words, sonars 40 convert reflected acoustic signal portions 44 into electromagnetic acousto-signals 46 that correspond to hull 24 and possible objects 6 and/or anomalies 7 on hull 24 and connect these corresponding electromagnetic acousto-signals 46 to control module 60. Electro-optic scanning array 50 converts reflected optical signal portions 54 into electromagnetic opto-signals 56 that correspond to hull 24 and possible objects 6 and/or anomalies 7 on hull 24 and connects corresponding electromagnetic opto-signals 56 to control module 60.

Control module 60 can have an RF transceiver 63 connected to computer 62 and to receive signals 46, 56 to transmit corresponding electromagnetic acousto-signals 46, and electromagnetic opto-signals 56 as amplified RF signals 48, 58 from antenna 64 to a remote station or facility 70 for evaluation and appropriate action. Antenna 64 can also receive control signals 71 from the remote station 70 for selectively actuating sonars 40 and array 50 by control module 60. Sonars 40 and array 50 can be controlled by remote control signals 71 to use different frequencies, operational cycles, different power levels etc. in accordance with control signals 71. In fact no personnel need to be at support structure 30 of survey system 10 during inspection of many different ships 20, but could be at remote station 70 at a facility where meaningful evaluations of RF signals 48, 58 can be made by highly trained technicians and/or military observers. Unattended operation of survey system 10 at support structure 30 can also reduce the possibility of injury or loss of life if an object 6 on a hull 24 is intentionally or unintentionally detonated.

Support structure 30 of survey system 10 can have a dry dock or barge-like shape that can be towed on water 5 to a desired site. Portions 31, 32, 33 can have buoyancy-ballast chambers 34 that include associated machinery to create inspection channel 39 of water 5 that has sufficient depth and width to receive and allow passage of ships 20 as they proceed underway through survey system 10. Support structure 30 of survey system 10 need not have all the other structure usually found on a barge-like vessel, but may be modified to have only a framework of structural members (e.g. corrosion resistant interconnected beams) extending as side portions 31, 32 and base portion 33. This kind of a framework would need to be connected to and supported by buoyancy-ballast chambers 34 at side portions 31, 32 to define channel 39 of water 5.

Support structure 30 of survey system 10 could also make use of structure that exists in the environment to define channel 39. Side portions 31, 32 could be banks of existing canals or parallel rock jetties that define passageways between bays and open water, and base portion 33 could be the bottom of the canal that is between the walls or the floor between the parallel jetties. In either case each sonar 40 and electro-optic scanning array 50 would be mounted on the banks or jetties and bottoms or floors and be oriented to point upward and toward the center of inspection channel 39 where ships 20 will pass for survey.

Each sonar 40 of survey system 10 can be an array of one or more transducers 41 that can transmit acoustic signals 42 through water 5, receive reflected acoustic portions 44 of transmitted acoustic signals 42, and create representative signals 46 representative of reflected acoustic portions 44. The spectral content of signals 42, 44 is such as to give acceptable resolution for objects 6 and anomalies 7 of interest that are desired to be detected.

Sonar 40 on each portion 31, 32 can be either of three highly effective off-the-shelf sonar technologies known in the art as side-scan sonar (side-looking sonar), synthetic aperture sonar, or high frequency sonar. Side scan sonar technology is a commercially available mature and uncomplicated technology used to classify mine-like contacts. Side scan sonar is available in varying frequencies depending on range and resolution required. These sonars require relative movement between the sonars and the background being investigated. In this application a relatively high frequency would be required to classify an object attached to a hull.

Typically, a side scan sonar for sonar 40 can use single or multiple acoustic beam(s) at frequencies in the range of 500 to 1000 Hz. at a range of twenty to forty feet from sonar 40 to ship 20 to provide acceptable resolution for identification of object 6 having dimensions greater than six to ten inches. A single beam, while acceptable for some scan rates and low resolutions, may not be fast enough for the extent of coverage of all of hull 24 of each ship 20 as it proceeds through survey system 10. Although multi-beams are more expensive, they can cover more area in real time. Therefore, a side scan sonar for each sonar 40 can use multiple sonar beams at frequencies in the range of 500 to 1000 Hz. at a range of twenty to forty feet from sonar 40 to ship 20 to provide acceptable resolution for identification of object 6 having dimensions greater than six to ten inches.

In addition to or in place of side scan sonar technology for each sonar 40, synthetic aperture sonar technology may be used for each sonar 40 to provide very high resolutions. Briefly, synthetic aperture sonar creates an improved sensing means wherein a single acoustic transducer is moved along the track of a desired, large array and the returned signals at each position along the track are processed to generate the high resolution of what appears to be a larger multiple array system. With the high resolution of synthetic aperture sonar of each sonar 40, false alarm rates are low and imaging capability is acceptable for objects 6 having dimensions as small as about one inch. Since synthetic aperture sonar for each sonar 40 is more complex and the constant velocity of each ship 20 must also be considered, additional processing capability (that takes into account a Doppler velocity log for ship velocity) is provided in control module 60.

Another option is to include high frequency sonar technology for sonar 40 in addition to or in place of side scan sonar and/or synthetic aperture sonar technology. Transmitting and receiving high frequency acoustic signals in excess of 1000 Hz. can provide acceptable resolution for identification of object 6 having dimensions greater than four to six inches.

Electro-optical scanning array 50 can utilize blue-green illumination by lasers 51 for optical signals 52 transmitted from array 50 through water 5 and onto each surveyed ship 20. Reflected optical portions 54 of transmitted optical signals 52 are received and detected by optical detectors 53 of array 50 which create signals 56 representative of reflected optical portions 54 and couple them to control module 60. This optical data gathering technology is currently mature and is capable of providing a very high resolution of about one-quarter of an inch at ranges between hull 24 and array 50 of no greater than about thirteen feet in inspection channel 39. There are few false alarms, and inspections of ships 20 can proceed to provide topographical information of hull 24 in real time with this optical technology;

The effectiveness of this optical data gathering technology must take into consideration water clarity that can change with changing weather conditions (storms) and water path length for accurate inspections and evaluations. Bio-fouling of sensor optics of optical detectors 53 might occur if electro-optic scanning array 50 is immersed in water 5 continuously for a period of time. In addition, upward looking lasers 51 can create potential safety issues that can be reduced when possible observers on ships 20 are forewarned of an inspection. Appropriate signs or flashing lights on support structure 30 should minimize this potential hazard.

In operation, survey system 10 can be taken to where it is needed to inspect ships 20 near a port facility or harbor. Survey system 10 can be towed through water 5 or disassembled, transported, and reconstructed at a desired survey site where it is moored by lines 8 extending to anchors (not shown). Many ships 20 of different displacements and configurations can be rapidly inspected in an uninterrupted sequence. Control module 60 can implement different scanning patterns for differently sized hulls 24 and send the gathered information via RF signals 48, 58 (or other means, such as optically, acoustically, over fibers, conductive wires, etc.) to remote station 70 for evaluation. Because of the size of inspection channel 39, each ship 20 may be steered by its crew through water 5 in inspection channel 39; however, a trained pilot may be preferred to make sure that each ship 20 is steered through the center of channel 39.

An operator at control module 60 or at distant survey station 70 can configure the direction, extent and durations of scanning patterns of sonars 40 and array 50 via control signals 71 to make appropriate scanning patterns that conform to the geometries and sizes of hulls 24 of ships 20 and initiate scanning of hulls 24 with sonars 40 and/or electro-optic array 50. Each ship 20 passes at the required speed between and past both sonars 40 and over and past electro-optic scanning array 50. Representative scan signals 46 and 56 from sonars 40 and array 50 are connected to control module 60, and RF transceiver 63 transmits RF signals 48, 58 that are representative of signals 46, 56 to a distant Coast Guard facility or designated authority for evaluation. If no object 6 is found, each ship 20 proceeds through and out of survey system 10 with no interruption. If a suspicious object 6 is detected or if dangerous hull anomalies 7 are found, the affected ship 20 is directed to a safe area for further, more detailed inspection and appropriate action.

Referring to FIG. 2, the method 100 of surveying or inspecting hulls 24 of ships 20 calls for the step of defining 104 an inspection channel 39 in water 5 by support structure 30 having a base portion 33 connected at opposite ends to first and second side portions 31, 32. The step of defining 104 can include the step of floating 105 support structure 30 on water 5 with buoyancy-ballast chambers 34 in first and second side portions 31, 32 and base portion 33 of support structure 30 to define inspection channel 39 in water 5.

The step of defining 104 permits the steps of receiving 106 passage of ship 20 through inspection channel 39 during inspection and transmitting 108 acoustic signals 42 from a sonar 40 mounted on first and second side portions 31, 32 that faces upward toward a center of inspection channel 39 onto each hull 24 of each ship 20 as each ship 20 passes through inspection channel 39. Next, the step of receiving 110 reflected acoustic signal portions 44 of the transmitted acoustic signals 42 that are representative of each hull 24 and objects 6 on each hull 24 at each sonar 40 permits the step of converting 112 reflected acoustic signal portions 44 into electromagnetic acousto-signals 46 corresponding to each hull 24 and objects 6 on each hull 24. The steps of transmitting 108, receiving 110 and converting 112 of acoustic signals includes the step of providing 109 at least one acoustic transducer 41 at each sonar 40.

The step of transmitting 114 optical signals 52 from an electro-optic scanning array 50 mounted on base portion 33 that faces upward toward the center of inspection channel 39 onto each hull 24 as each ship 20 passes through inspection channel 39 allows the step of receiving 116 reflected optical signal portions 54 of transmitted optical signals 52 that are representative of each hull 24 and objects 6 on each hull 24 at array 50. The step of transmitting 114 optical signals includes providing 115 at least one laser 51 at array 50 The steps of transmitting 114 and receiving 116 assure the step of converting 118 reflected optical signal portions 54 into electromagnetic opto-signals 56 corresponding to each hull 24 and objects 6 on hull 24 at array 50. The steps of receiving 116 and converting 118 include providing 117 at least one optical detector 53 at array 50.

The step of receiving 120 corresponding electromagnetic acousto-signals 46 and corresponding electromagnetic opto-signals 56 at a control module 60 permits the step of transmitting 122 corresponding electromagnetic acousto-signals 46 and corresponding electromagnetic opto-signals 56 as amplified RF signals 48, 58.

The step of receiving 124 amplified RF signals 48, 58 at a remote station 70 permits the steps of evaluating 126 amplified RF signals 48, 58 for objects 6 on hulls 24 and controlling 128 operation of sonars 40 and electro-optic scanning array 50 from remote station 70.

The method and survey system 10 of the invention can be implemented with a major savings in manpower and time as compared to the current dangerous method of using divers. Survey system 10 makes a complete 100% hull survey that was not possible before, and the inspection is in a fraction of the time of the hit-or-miss inspections by divers. The rapid inspection by survey system 10 does not hold up the departure or arrival of ship 20 and minimizes the impact on operations of ship 20 or port facilities. Survey system 10 increases the safety of the port area since the inspections of ships 20 can be performed away from the actual port in the event a hazardous device is indeed located. Due to the reduced time required to survey with survey system 10, hulls 24 of more ships 20 can be surveyed than present methods allow to additionally enhance safety.

Having the teachings of this invention in mind, modifications and alternate embodiments of survey system 10 may be adapted without departing from the scope of the invention. In accordance with this invention, sonars 40 could be replaced with additional electro-optic scanning arrays 50 on one or both side portions 31, 32, or array 50 on base portion 33 could be replaced by sonar 40. Survey system 10 could have different configurations and locations on waterways to allow rapid effective hull inspections that might additionally indicate that marine organisms and other marine contamination should be cleaned to reduce fuel-wasting drag. If the necessity for survey system 10 has passed, it can be taken from one near-harbor location and relocated at another where it is needed or placed in storage for use at a future time.

The disclosed components and their arrangements as disclosed herein all contribute to the novel features of this invention. Survey system 10 can provide for quick, thorough inspections of hulls 24 of many ships 20 at a safe distance away from harbors or other marine facilities to identify suspicious objects 6 that may have been covertly attached and other anomalies 7 on hulls 24 for appropriate action. Therefore, survey system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A survey system for inspecting hulls of ships comprising:
    a support structure having a base portion connected at opposite ends to first and second side portions to define an inspection channel in water having a width and depth sufficient to receive and allow passage of a ship during inspection;
    a sonar mounted on each of said first and second side portions facing upward toward the center of said inspection channel, each sonar transmitting acoustic signals onto the hull of said ship as said ship passes through said inspection channel, receiving reflected acoustic signal portions of said transmitted acoustic signals representative of said hull and objects on said hull, and converting said reflected acoustic signal portions into electromagnetic acousto-signals corresponding to said hull and said objects on said hull;
    an electro-optic scanning array mounted on said base portion facing upward toward the center of said inspection channel, said array transmitting optical signals onto said hull as said ship passes through said inspection channel, receiving reflected optical signal portions of said transmitted optical signals representative of said hull and objects on said hull, and converting said reflected optical signal portions into electromagnetic opto-signals corresponding to said hull and said objects on said hull; and
    a control module coupled to each sonar and said array and configured to control each sonar and said array and receive said corresponding electromagnetic acousto-signals and said corresponding electromagnetic opto-signals.

2. The system of claim 1 further comprising:
    a remote control station configured to transmit control signals to said control module; wherein said control module is configured to transmit said electromagnetic acousto-signals and said electromagnetic opto-signals to said remote control station and to receive control signals from said remote control station; and wherein said remote control station is further configured to receive said electromagnetic acousto-signals and said electromagnetic opto-signals transmitted from said control module.

3. The system of claim 2 wherein:
    each said sonar has at least one acoustic transducer configured to transmit said acoustic signals onto said hull as said ship passes through said inspection channel, receive said reflected portions of said transmitted acoustic signals representative of said hull and objects on said hull, and convert said reflected acoustic signal portions into said electromagnetic acousto-signals corresponding to said hull and said objects on said hull;
    said array has at least one laser configured to transmit said optical signals onto said hull as said ship passes through said inspection channel; and
    said array has at least one optical detector configured to receive said reflected portions of said transmitted optical signals representative of said hull and objects on said hull, and convert said reflected optical signal portions into said electromagnetic opto-signals corresponding to said hull and said objects on said hull.

4. The system of claim 3 wherein said control module is configured to transmit said electromagnetic acousto-signals and said electromagnetic opto-signals as amplified RF signals, and wherein said control module has a power supply, a computer programmed to control the operation of said sonars and array, and an RF antenna capable of transmitting RF signals to said remote station.

5. The system of claim 4 wherein said first and second side portions and said base portion of said support structure have buoyancy-ballast chambers for floating said support structure on said water to define said inspection channel in said water.

6. The system of claim 4 wherein said first and second side portions and said base portion of said support structure are the banks and bottom, respectively, of a canal-like waterway and said inspection channel is the canal-waterway.

7. A method of inspecting the hull of a ship comprising the steps of:
    defining an inspection channel in water, said inspection channel having a base portion connected at opposite ends to first and second side portions;
    receiving passage of ships through said inspection channel during inspection thereof;
    transmitting acoustic signals onto the hull of said ship as said ship passes through said inspection channel, said transmitting of acoustic signals being from a sonar mounted on each of said first and second side portions and facing upward toward the center of said inspection channel;
    receiving at said sonar reflected acoustic signal portions of said transmitted acoustic signals representative of said hull and objects on said hull;
    converting said reflected acoustic signal portions into electromagnetic acousto-signals corresponding to said hull and said objects;
    transmitting optical signals onto said hull as said ship passes through said inspection channel, said transmitting of optical signals being from an electro-optic scanning array mounted on said base portion facing upward toward the center of said inspection channel;
    receiving at said array reflected optical signal portions of said transmitted optical signals representative of said hull and said objects;
    converting said reflected optical signal portions into electromagnetic opto-signals corresponding to said hull and said objects;

receiving said corresponding electromagnetic acousto-signals and said corresponding electromagnetic opto-signals at a control module; and transmitting said corresponding electromagnetic acousto-signals and said corresponding electromagnetic opto-signals as amplified RF signals.

8. The method of claim 7 further comprising the steps of:

receiving said amplified RF signals at a remote station;

evaluating said amplified RF signals at said remote station for objects on said hull; and controlling operation of said sonars and said electro-optic scanning array from said remote station.

9. The method of claim 8 further comprising the steps of:

providing at least one acoustic transducer at each sonar for the steps of transmitting acoustic signals, receiving reflected portions of said transmitted acoustic signals, and converting said reflected acoustic signal portions into electromagnetic acousto-signals corresponding to said hull and said objects;

providing at least one laser at said array for the step of transmitting optical signals; and providing at least one optical detector at said array for the steps of receiving said reflected optical signal portions of said transmitted optical signals representative of said hull and said objects, and converting said reflected optical signal portions into electromagnetic opto-signals corresponding to said hull and said objects.

10. The method of claim 9 wherein said step of defining an inspection channel comprises the steps of:

providing a support structure having a base portion connected at opposite ends to first and second side portions, said base portion and first and second side portions containing buoyancy-ballast chambers; and flooding said buoyancy-ballast chambers to float said support structure in said water at a depth sufficient to allow a ship to pass therethrough.

* * * * *